(12) United States Patent
Bendewald et al.

(10) Patent No.: US 10,065,655 B2
(45) Date of Patent: Sep. 4, 2018

(54) METHOD FOR A DRIVER ASSISTANCE SYSTEM OF A VEHICLE

(71) Applicant: VOLKSWAGEN AKTIENGESELLSCHAFT, Wolfsburg (DE)

(72) Inventors: Lennart Bendewald, Wolfsburg (DE); Linn Hackenberg, Wolfsburg (DE)

(73) Assignee: Volkswagen AG (DE)

( * ) Notice: Subject to any disclaimer, the term of this patent is extended or adjusted under 35 U.S.C. 154(b) by 270 days.

(21) Appl. No.: 15/026,689

(22) PCT Filed: Sep. 30, 2014

(86) PCT No.: PCT/EP2014/070980
§ 371 (c)(1),
(2) Date: Apr. 1, 2016

(87) PCT Pub. No.: WO2015/049254
PCT Pub. Date: Apr. 9, 2015

(65) Prior Publication Data
US 2016/0244070 A1    Aug. 25, 2016

(30) Foreign Application Priority Data
Oct. 1, 2013   (DE) .................. 10 2013 110 865

(51) Int. Cl.
*B60W 50/08* (2012.01)
*B62D 1/181* (2006.01)
(Continued)

(52) U.S. Cl.
CPC .......... *B60W 50/082* (2013.01); *B60W 50/08* (2013.01); *B60W 50/12* (2013.01);
(Continued)

(58) Field of Classification Search
None
See application file for complete search history.

(56) References Cited

U.S. PATENT DOCUMENTS

| 5,855,144 A | 1/1999 | Parada |
| 2002/0058566 A1* | 5/2002 | Heim ................. B60W 30/182 477/44 |

(Continued)

FOREIGN PATENT DOCUMENTS

| CN | 101380951 A | 3/2009 |
| CN | 101823435 A | 9/2010 |

(Continued)

OTHER PUBLICATIONS

Office Action of Chinese Patent Application No. 201480054382.4; dated Aug. 31, 2017.

(Continued)

*Primary Examiner* — Rami Khatib
*Assistant Examiner* — Gerrad A Foster
(74) *Attorney, Agent, or Firm* — Barnes & Thornburg LLP (57) ABSTRACT

A method for a driver assistance system of a vehicle. The vehicle includes a steering wheel which can be moved manually between a first position and a second position. The steering wheel lies at a farther distance from a user sitting in a driver's seat of the vehicle in the second position than in the first position. In the method, a position of the steering wheel is detected and the driver assistance system is set based on the position of the steering wheel. Also disclosed is a method for a driver assistance system in which two operating elements have to be actuated simultaneously to set the driver assistance system. Also disclosed is a combination of the methods and the associated systems.

16 Claims, 3 Drawing Sheets

(51) Int. Cl.
  *B62D 1/28* (2006.01)
  *B60W 50/12* (2012.01)
  *B62D 1/04* (2006.01)
  *B62D 1/183* (2006.01)
  *B62D 1/185* (2006.01)
  *B60W 30/12* (2006.01)
  *B60W 30/16* (2012.01)

(52) U.S. Cl.
  CPC .............. *B62D 1/04* (2013.01); *B62D 1/181* (2013.01); *B62D 1/183* (2013.01); *B62D 1/185* (2013.01); *B62D 1/28* (2013.01); *B60K 2350/928* (2013.01); *B60W 30/12* (2013.01); *B60W 30/16* (2013.01); *B60W 2510/20* (2013.01); *B60W 2540/04* (2013.01)

(56) References Cited

U.S. PATENT DOCUMENTS

| | | | |
|---|---|---|---|
| 2011/0187516 A1* | 8/2011 | Makinen | B60W 50/16 340/425.5 |
| 2013/0002416 A1* | 1/2013 | Gazit | B62D 1/28 340/438 |
| 2014/0277896 A1* | 9/2014 | Lathrop | B62D 1/04 701/23 |

FOREIGN PATENT DOCUMENTS

| | | |
|---|---|---|
| CN | 103223969 A | 7/2013 |
| DE | 19743024 A1 | 4/1999 |
| DE | 102006006995 A1 | 8/2007 |
| DE | 102007039375 A1 | 3/2009 |
| DE | 102011006448 A1 | 10/2011 |

OTHER PUBLICATIONS

Search Report for International Patent Application No. PCT/EP2014/070980; dated Apr. 16, 2015.

* cited by examiner

METHOD FOR A DRIVER ASSISTANCE SYSTEM OF A VEHICLE

PRIORITY CLAIM

This patent application is a U.S. National Phase of International Patent Application No. PCT/EP2014/070980, filed 30 Sep. 2014, which claims priority to German Patent Application No. 10 2013 110 865.2, filed 1 Oct. 2013, the disclosures of which are incorporated herein by reference in their entirety.

FIELD

Illustrative embodiments relate to a method for a driver assistance system of a vehicle and also to a system for activating a driver assistance system in a vehicle. Illustrative embodiments relate, in particular, to methods for activating and deactivating a so-called autopilot function of the driver assistance system.

SUMMARY

Driver assistance systems, which make partially or fully automatic driving of the vehicle possible, are increasingly being used in vehicles, such as, for example, passenger cars or trucks. Modern or future vehicles may therefore be capable under certain conditions of independently taking over both the lateral guidance and the longitudinal guidance. In this case, a driver of the vehicle does not have to monitor this automatic guidance of the vehicle the whole time, which is also referred to as the autopilot function, but can at a suitable point in time transfer the guidance of the vehicle to the autopilot function or retrieve it.

Customary driver assistance systems, such as, for example, automatic speed control systems, in particular adaptive speed control systems, which adapt the speed of the vehicle to vehicles driving in front, have so far been set and configured by using a steering wheel button or steering wheel control lever.

With an activation or deactivation of the autopilot function, much of the responsibility for guiding the vehicle is transferred to the vehicle electronics or to the driver. An activation or deactivation of the autopilot function should therefore not take place inadvertently. On the other hand, a simple and intuitive transfer of responsibility to the vehicle or retrieval of responsibility by the driver is desirable.

Disclosed embodiments provide an intuitive, easy-to-operate and safe transfer of responsibility between an autopilot function of the vehicle and a driver.

Disclosed embodiments provide a method for a driver assistance system of a vehicle and a system for activating a driver assistance system in a vehicle.

BRIEF DESCRIPTION OF THE FIGURES

Disclosed embodiments are described in detail below with reference to the accompanying drawings.

DETAILED DESCRIPTION OF THE DISCLOSED EMBODIMENTS

Disclosed embodiments provide a method for a driver assistance system of a vehicle. The vehicle comprises a steering wheel which is adjustable between a first position and a second position. The steering wheel may, for example, be adjusted between the first position and the second position manually by a driver, for example, even while driving. Alternatively or in addition, the steering wheel may be movable between the first position and the second position by a suitable drive, for example, an electrical drive, for example, on the basis of an actuation of an operator control element by the driver or on the basis of an activation of the driver assistance system. In the second position, the steering wheel is further away from a user sitting in a driver's seat of the vehicle than in the first position. To put it another way, the steering wheel can be moved manually away from the driver of the vehicle in the direction of the dashboard or pulled toward the driver. When the steering wheel has been pushed away from the driver in the direction of the dashboard, it is in the second position. On the other hand, when it has been pulled toward the driver, it is in the first position. In the case of the method, a current position of the steering wheel is sensed and the driver assistance system is set based on the position of the steering wheel. To put it another way, the driver assistance system is set based on whether the steering wheel is in the first position or in the second position. For example, an autopilot function of the driver assistance system may be activated or deactivated based on the position of the steering wheel.

The autopilot function concerns a function of the driver assistance system which is capable of automatically controlling the vehicle at least in certain situations or on certain roads, such as, for example, freeways or country roads. In other words, the autopilot function takes over the longitudinal guidance and/or the lateral guidance of the vehicle and controls the vehicle without intervention or action on the part of the driver. The control of the vehicle with the aid of the autopilot function is also referred to as highly automated driving or autonomous driving.

As described above, the autopilot function is capable of controlling the vehicle at least partially automatically, for example, independently taking over both the lateral and longitudinal guidance. The autopilot function may, for example, be activated when the steering wheel is in the second position, i.e., when the steering wheel has been pushed away from the driver in the direction of the dashboard. Conversely, the autopilot function may be deactivated when the steering wheel is in the first position, i.e., when the driver has pulled the steering wheel toward him again. This allows intuitive operation of the autopilot to be achieved. By pushing the steering wheel away, the responsibility for guiding the vehicle is transferred away from the user to the vehicle. By pulling the steering wheel, the responsibility for guiding the vehicle is brought back again to the driver. In particular, rapid retrieval of the responsibility is possible by pulling the steering wheel. This clear movement of the steering wheel also means that inadvertent activation or deactivation of the autopilot function can be avoided. In addition, a current activation state of the autopilot function can be easily recognized by the position of the steering wheel. When the steering wheel has been displaced in the direction of the dashboard, the autopilot is active and there is in addition increased space available for the driver. When the steering wheel has been pulled toward the driver, in the first position, the steering wheel is in a position where it can be operated well by the driver for guiding the vehicle.

According to a disclosed embodiment, the steering wheel is additionally automatically adjustable. This automatic adjustment may be realized, for example, with the aid of a motor-driven steering wheel adjustment, which in the case of the vehicle is provided for the optimum adjustment of the steering wheel setting for different drivers. In the case of the method, the steering wheel is automatically adjusted into the first position when the steering wheel is manually adjusted by the user or driver partially from the second position in the direction of the first position. If, for example, the driver deactivates the autopilot function, and for this purpose pulls the steering wheel toward him from the second position, it can be ensured by the automatic adjustment of the steering wheel into the first position that the steering wheel is brought into a position that is favorable for the driver for guiding the vehicle.

According to a disclosed embodiment, the steering wheel is adjustable between the first position and the second position in the direction of a longitudinal axis of a steering column of the vehicle. It is usual in the case of many vehicles for such an adjustment to be provided, to be able to adapt the position of the steering wheel to drivers of different sizes. In addition, the steering wheel may also be adjustable between the first position and the second position by a tilting movement, if a corresponding joint is provided at a suitable point in the steering column of the vehicle. In the case of vehicles with electronic steering, so-called steer-by-wire, the steering wheel may be adjustable between the first position and the second position along any desired trajectory, since in this case there is no steering column for the mechanical coupling of the steering wheel to a steering gear of the vehicle. Consequently, depending on the available adjustability of the steering wheel, the method described above can be realized at low cost.

As described above, the autopilot function of the driver assistance system may be activated or deactivated based on the current position of the steering wheel. Alternatively or in addition, the autopilot function may be activated already by the movement of the steering wheel from the first position into the second position and, conversely, the autopilot function may be deactivated by the movement of the steering wheel from the second position into the first position. The activation or deactivation of the autopilot function may consequently already take place when the driver moves the steering wheel along a partial distance between the first position and the second position away from the driver or toward the driver. The remaining distance to reach the first position or second position may be covered, for example, by the automatic adjustment of the steering wheel by means of a motorized drive.

Disclosed embodiments provide a further method for a driver assistance system of a vehicle. The vehicle comprises a steering wheel on which a first operator control element and a second operator control element are arranged. In the case of the method, actuation of the first and second operator control elements is sensed and the driver assistance system is set based on the simultaneous actuation of the first and second operator control elements. The fact that the driver assistance system is only set when the first and second operator control elements are actuated simultaneously means that inadvertent setting or configuration of the driver assistance system can be avoided. The arrangement of the first and second operator control elements on the steering wheel allows the driver assistance system to be set in an easy way with quick access, without the driver having to take his hands off the steering wheel.

According to a disclosed embodiment, the driver assistance system comprises an autopilot function which is capable of controlling the vehicle at least partially automatically. The setting of the driver assistance system accordingly takes place based on the simultaneous actuation of the first and second operator control elements. If the first and second operator control elements are actuated simultaneously and the autopilot function is deactivated, the autopilot function is activated. Conversely, if the first and second operator control elements are actuated simultaneously and the autopilot function is activated, the autopilot function is deactivated. The fact that the autopilot function is only activated or deactivated whenever the two operator control elements are actuated simultaneously means that an inadvertent activation or deactivation of the autopilot function can be avoided.

According to a further disclosed embodiment, the first operator control element comprises a first rocker switch and the second operator control element comprises a second rocker switch. The first and second rocker switches respectively have a first pressure actuating region and a second pressure actuating region. The first pressure actuating regions of the first and second rocker switches may, for example, be provided with a symbol and/or an inscription which identifies a switching on or activation of the autopilot function. The second pressure actuating regions of the first and second rocker switches may be respectively provided with a symbol and/or an inscription which identifies a deactivation of the autopilot function. If the first pressure actuating regions respectively on the first and second rocker switches are actuated simultaneously, the autopilot function of the driver assistance system is activated. If, on the other hand, the respective second pressure actuating regions on the first and second rocker switches are actuated, the autopilot function is deactivated. The fact that the corresponding pressure actuating regions on two rocker switches have to be actuated simultaneously to activate or deactivate the autopilot function means that an inadvertent activation or deactivation can be avoided. Arranging the rocker switches on the steering wheel allows easy operation to be ensured.

According to a disclosed embodiment, the first operator control element is arranged on a first spoke of the steering wheel and the second operator control element is arranged on a second spoke of the steering wheel. Arranging the first and second operator control elements on two different spokes of the steering wheel means that an inadvertent actuation of the two operator elements by them being touched with a hand or a finger can be avoided. To put it another way, arranging the first and second operator control elements on two different spokes of the steering wheel ensures that the first and second operator control elements are arranged at a sufficient distance apart to avoid inadvertent simultaneous actuation.

According to a further disclosed embodiment, a distance between the first and second operator control elements is such that the first and second operator control elements can be actuated simultaneously with the fingers of one hand of the user. To put it another way, in spite of being arranged at a distance from one another, the first and second operator control elements are arranged only so far apart that they can be simultaneously actuated, for example, with two different fingers of one hand, to make it possible for the driver assistance system to be operated even by drivers with one arm or drivers with one hand. The distance between the first and second operator control elements may be, for example, 5-10 cm, so that the first and second operator control elements can, for example, be actuated simultaneously with the thumb and index finger of one hand of the user.

The first and second operator control elements may in particular be arranged on spokes of the steering wheel on which no further operator control elements are arranged. Nowadays, it is usual for a large number of operator control elements to be arranged on a steering wheel of a vehicle, for example, for controlling an infotainment system of the vehicle or a navigation system of the vehicle. In the case of this embodiment, the first operator control element and the second operator control element, with which the autopilot function can be activated or deactivated, are arranged on spokes on which no further operator control elements of other systems of the vehicle are provided. To put it another way, operator control elements, for example, of an infotainment system or a navigation system of the vehicle are arranged on other spokes of the steering wheel. This clear separation between operator control elements for the activation and deactivation of the autopilot function and operator control elements for other functions of the vehicle, such as, for example, the infotainment or navigation system, allows an inadvertent activation or deactivation of the autopilot function to be avoided. In addition, the first operator control element and the second operator control element can be actuated quickly and reliably, for example, to deactivate the autopilot function and to make vehicle guidance by the driver of the vehicle possible.

In the case of a further disclosed embodiment of the method, the vehicle comprises a steering wheel which is automatically adjustable between a first position and a second position. In the second position, the steering wheel is further away from a user sitting in a driver's seat of the vehicle than in the first position. The steering wheel is, for example, automatically adjustable by means of an electrical drive in the direction of a longitudinal axis of a steering column to which the steering wheel is connected. The steering wheel is automatically adjusted from the first position into the second position based on the simultaneous actuation of the first and second operator control elements. In particular, the steering wheel may be moved automatically from the first position into the second position when the autopilot function is activated by simultaneous actuation of the first and second operator control elements. On the basis of the position of the steering wheel, the driver and the occupants of the vehicle can recognize the current operating mode of the vehicle (autopilot operation or manual operation) in an easy and intuitive way.

Furthermore, in the case of the method, an end of an autopilot portion of a route can be determined. Along the autopilot portion of a route, the autopilot function can control the vehicle automatically and, as from the end of the autopilot portion of a route, the driver must control the vehicle again. When the vehicle approaches the end of the autopilot portion of a route, the steering wheel is automatically adjusted from the second position into the first position. As a result, the driver is intuitively requested to resume the task of driving. The driver may acknowledge taking over the driving task, for example, by simultaneously actuating the two operator control elements, whereby the autopilot function is deactivated. Alternatively, the steering wheel may have sensors for sensing when the steering wheel is touched by the driver and the driver may confirm taking over the driving task by placing his hands on the steering wheel.

The methods described above may be combined with one another in any way desired. In particular, the method which uses the steering wheel that is manually adjustable between the first position and the second position may be combined with the method which uses the first and second operator control elements, so that, for example, an autopilot is only activated if both the steering wheel is pushed away from the driver in the direction of the dashboard and the first and second operator control elements are actuated simultaneously. Alternatively, the autopilot function may also be activated if, for example, either the steering wheel is pushed away from the driver, from the first position into the second position, or the first and second operator control elements are actuated simultaneously.

Disclosed embodiments provide a system for activating a driver assistance system in a vehicle. The system comprises a steering wheel which is adjustable between a first position and a second position. In the second position, the steering wheel is further away from a user sitting in a driver's seat of the vehicle than in the first position. The system also comprises a sensing device for sensing the position of the steering wheel and a processing device which is designed so as to set the driver assistance system based on the position of the steering wheel. The system is consequently suitable for carrying out the method described above, and therefore also comprises the benefits that have been mentioned above in the description of the disclosed method.

A further system for activating a driver assistance system in a vehicle is provided, comprising a steering wheel and a processing device. Arranged on the steering wheel are a first operator control element and a second operator control element. The processing device is capable of setting the driver assistance system based on a simultaneous actuation of the first and second operator control elements. The system is therefore suitable for carrying out the method described above and therefore also comprises the benefits set out in connection with the method described above.

The systems described above may be combined with one another, so that the driver assistance system is set based on the simultaneous actuation of the first and second operator control elements and based on the position of the steering wheel.

A vehicle which comprises a driver assistance system and the system described above is also provided.

Figure 1:
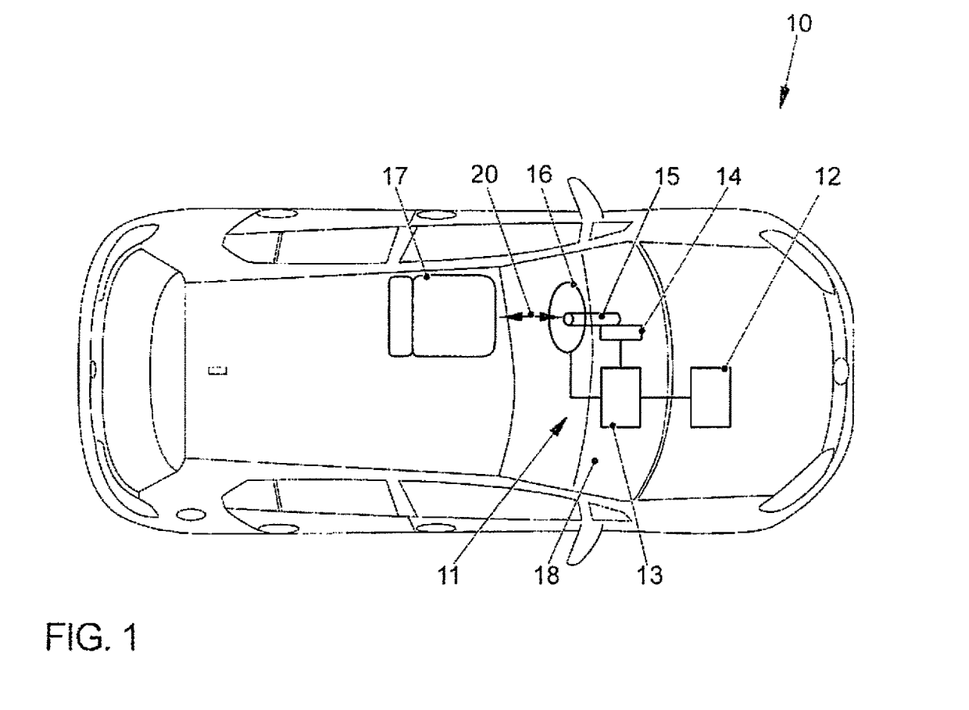
FIG. 1 schematically shows a vehicle according to a disclosed embodiment.

FIG. 1 shows a vehicle 10 with a driver assistance system 12 and a system 11 for activating the driver assistance system 12. The driver assistance system 12 comprises in particular a so-called autopilot function, which can at least under certain conditions independently take over both the lateral guidance and the longitudinal guidance of the vehicle 10. The system 11 serves for activating and deactivating this autopilot function based on an interaction between a driver sitting in a driver's seat 17 and a steering wheel 16 of the vehicle 10. For sensing this interaction, the system 11 comprises a sensing device 14, which is, for example, coupled to a steering column of the steering wheel, to sense a current position of the steering wheel 16. Furthermore, the system 11 comprises a processing device 13, which activates the driver assistance systems 12. The processing device 13 may be coupled to the sensing device 14 and/or to operator control elements (not shown in FIG. 1) on the steering wheel 16. Also shown in FIG. 1 is a dashboard 18, which from the viewpoint of the driver sitting in the driver's seat 17 is arranged behind the steering wheel 16. A first embodiment for activating and deactivating the autopilot function of the driver assistance system 12 is described below with reference to FIGS. 2 and 3 and a second embodiment for the activation and deactivation of the autopilot function is described below with reference to FIGS. 4 and 5. The two embodiments may be realized independently of one another or in combination, since they complement one another very well.

Figure 2:
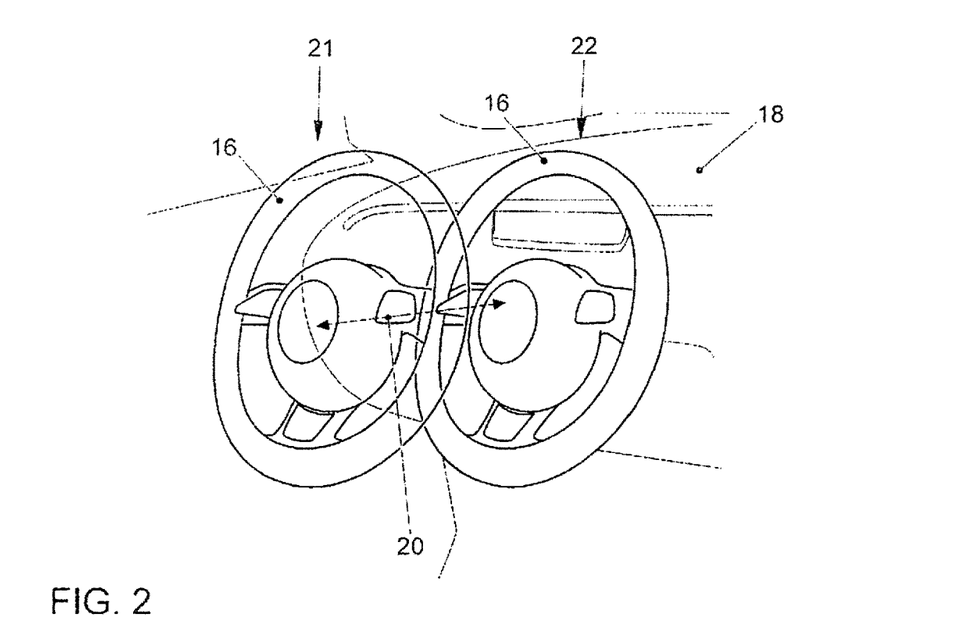
FIG. 2 shows a steering wheel of a system for activating a driver assistance system according to a disclosed embodiment.

FIG. 2 shows a partial view of the passenger compartment of the vehicle 10. The dashboard 18 is represented, with the steering wheel 16 arranged in front of it. The steering wheel 16 is displaceable along the arrow 20 and in FIG. 2 is represented in two different positions 21, 22. In the first position 21, the steering wheel 16 is located closer to the driver sitting in the driver's seat 17 than in the second position 22. To put it another way, the steering wheel 16 in the second position 22 is closer to the dashboard 18 than in the first position 21. The steering wheel 16 can be displaced manually by the driver along the arrow 20 between the first position 21 and the second position 22. The sensing device 14 is capable of determining a current position of the steering wheel 16 with respect to the displacement in the direction of the arrow 20. The processing device 13 evaluates the sensed steering wheel position and activates the driver assistance system 12 correspondingly.

Figure 3:
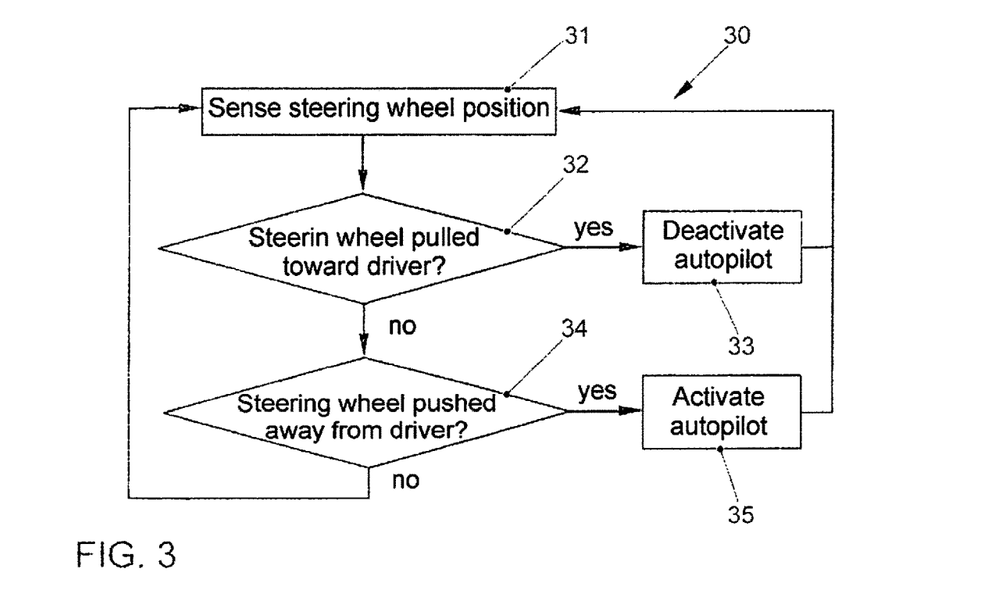
FIG. 3 shows a method for a driver assistance system according to a disclosed embodiment.

The way in which the processing device 13 operates is described in detail below with reference to FIG. 3. FIG. 3 shows a method 30, which is performed by the processing device 13. In step 31, a current steering wheel position is determined with respect to the movement of the steering wheel 16 in the direction of the arrow 20. In step 32, it is determined whether the steering wheel 16 is pulled toward the driver, i.e., whether the steering wheel 16 is in the first position 21 or is at least moved along a certain distance along the arrow 20 from the second position 22 to the first position 21. If the steering wheel is pulled toward the driver, in step 33 the autopilot function of the driver assistance system 12 is deactivated. Otherwise, in step 34 it is checked whether the steering wheel is pushed away from the driver, i.e., whether the steering wheel is in the second position 22, or at least has been moved for a certain amount of the distance along the path 20 from the first position 21 in the direction of the second position 22. In this case, in step 35 the autopilot function of the driver assistance system 12 is activated. After that, the method is continued in step 31 with renewed sensing of the current steering wheel position.

The simple, for example, one-dimensional, displaceability of the steering wheel toward the dashboard 18 and away from the dashboard 18 makes intuitive activation and deactivation of the autopilot function possible. The autopilot can be activated by pushing the steering wheel away from the driver and the autopilot function can be deactivated by pulling the steering wheel toward the driver. Such a metaphor for the transfer of responsibility to the vehicle, in that the driver displaces the steering wheel 16 in the direction of the vehicle or brings it back in the direction of the driver, is extremely comprehensible and intuitive. Furthermore, pulling the steering wheel 16 toward oneself makes it possible to end very quickly the driving taken over by the autopilot function. This may be beneficial in critical driving situations. In addition, the activation state of the autopilot function is indicated easily and clearly by the current position of the steering wheel 16. Furthermore, the displaceability of the steering wheel 16 toward the dashboard 18 increases the space available in the region of the driver when the autopilot function is activated.

As described above, the steering wheel 16 may be moved manually by a driver of the vehicle 10 along the arrow 20 between the first position 21 and the second position 22 to activate or deactivate the autopilot function. In addition, the steering wheel 16 may have an automatic adjustment, which is, for example, electromotively driven. This automatic adjustment may, for example, move the steering wheel automatically into the first position 21 or the second position 22 when the driver has displaced the steering wheel 16 at least along a certain amount of the distance in the direction of the corresponding position 21 or 22. It can be ensured as a result that, when the autopilot function is deactivated, the steering wheel 16 is in an operating position suitable for the driver and, when the autopilot function is activated, a maximum available space is provided in the region in front of the driver.

Figure 4:
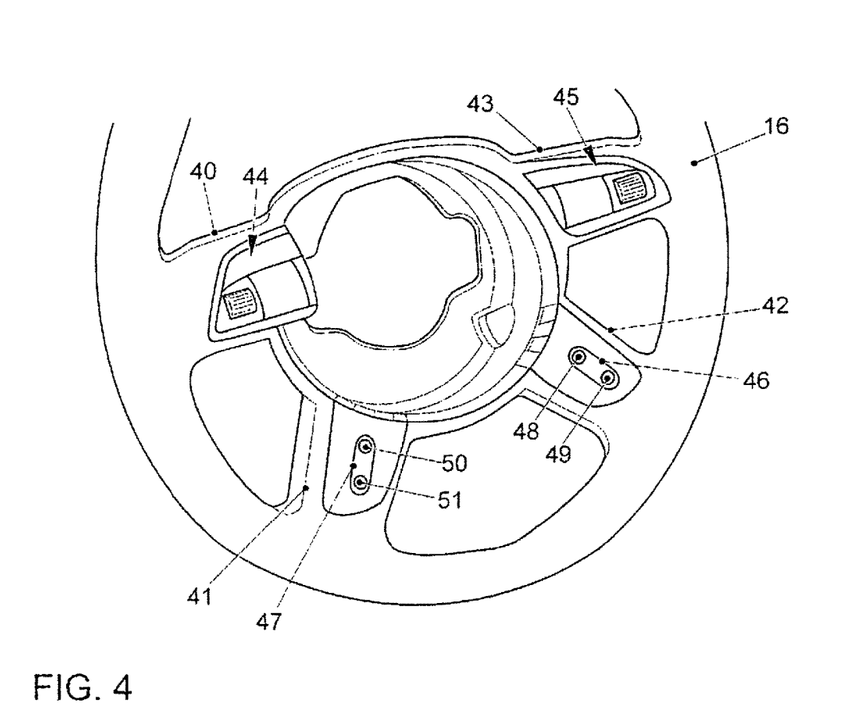
FIG. 4 shows a steering wheel of a system for activating a driver assistance system according to a further embodiment.
Figure 5:
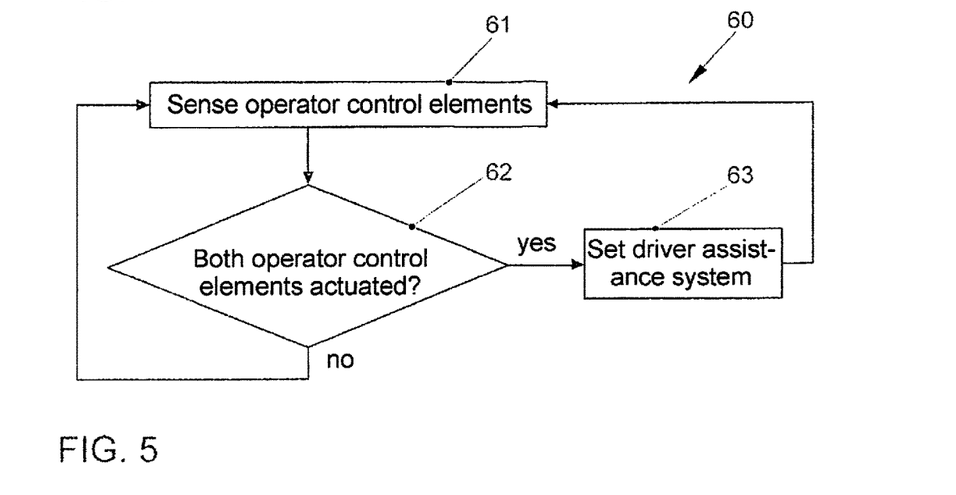
FIG. 5 shows a method for a driver assistance system according to a further embodiment.

With reference to FIGS. 4 and 5, a further method for activating and deactivating the autopilot function of the driver assistance system 12 is described. FIG. 4 shows the steering wheel 16 in detail. The steering wheel 16 has four spokes 40-43. Customary operator control elements 44 and 45, for example, for operating an infotainment system of the vehicle 10, are provided on the spokes 40 and 43. Provided on the spokes 41 and 42 are operator control elements 46 and 47, which are used for the activation and deactivation of the autopilot function. This arrangement of the operator control elements 46, 47 on separate spokes 41, 42 of the steering wheel 16 makes a clear functional assignment possible. The separation of the operator control elements 46, 47 for operating the autopilot function from the other operator control elements 44, 45 avoids an inadvertent activation or deactivation of the autopilot function.

To avoid an inadvertent activation or deactivation of the autopilot function, a simultaneous actuation of the operator control elements 46, 47 is also required. FIG. 5 shows a corresponding method 60, in which an actuating state of the operator control elements 46, 47 is sensed in step 61 and it is checked in step 62 whether both operator control elements 46, 47 are actuated. Only when both operator control elements 46, 47 are actuated is the driver assistance system 12 set in step 63 according to the actuation of the two operator control elements 46, 47. For example, when there is simultaneous actuation of the operator control elements 46, 47, the autopilot function is alternately activated and deactivated, i.e., if the autopilot function is deactivated, it is activated by simultaneous actuation of the operator control elements 46, 47 and, if the autopilot function is activated, it is deactivated by simultaneous actuation of the operator control elements 46, 47. In this case, it is sufficient that the operator control elements 46, 47 respectively comprise a pushbutton switch.

However, as represented, for example, in FIG. 4, the operator control elements 46, 47 may respectively also have a so-called rocker switch. In the case of this embodiment, the first operator control element 46 comprises a rocker switch with a first pressure actuating region 48 and a second pressure actuating region 49. The first pressure actuating region 48 may, for example, have a symbol or an inscription for activating the autopilot function and the second pressure actuating region 49 may have a corresponding symbol or a corresponding inscription for deactivating the autopilot function. The second operator control element 47 likewise has a first pressure actuating region 50 and a second pressure actuating region 51. In turn, the first pressure actuating region 50 may be provided with a symbol or inscription for activating the autopilot function and the second pressure actuating region 51 may be provided with a symbol or inscription for deactivating the autopilot function. To activate the autopilot function, a driver simultaneously actuates the first pressure actuating regions 48 and 50, and, to deactivate the autopilot function, a driver simultaneously actuates the second pressure actuating regions 49 and 51. This allows an inadvertent activation or deactivation of the autopilot function to be reliably prevented.

The embodiments described above may be combined with one another. For example, in the case of such a combination, the autopilot function is activated whenever the two first pressure actuating regions 48 and 50 are actuated simultaneously and at the same time the steering wheel 16 is displaced from the first position 21 into the second position 22. The autopilot function can be deactivated by the two second pressure actuating regions 49 and 51 being actuated simultaneously and at the same time the steering wheel 16 being pulled from the second position 22 in the direction of the driver into the first position 21. Alternatively, the autopilot function can also be deactivated when the steering wheel is pulled from the second position 22 to the first position 21 even without actuation of the operator control elements 46, 47, for example, to make it possible for the driver to quickly take over the vehicle guidance.

Furthermore, the distance between the operator control elements 47, 49 on the steering wheel 16 may be chosen such that the operator control elements 46, 47 can be operated simultaneously with the fingers of one hand, for example, with the thumb and index finger of one hand, to make operation by drivers with only one hand possible.

Furthermore, the steering wheel 16 may be automatically adjustable between the first position 21 and the second position 22 by means of an electrical drive. When the autopilot function has been activated by actuating the operator control elements 46, 47, the steering wheel 16 may be automatically moved from the first position 21 into the second position 22. The driver and the occupants can easily and intuitively recognize from the current position of the steering wheel whether the vehicle 10 is in autopilot mode or in manual mode. If the autopilot function determines that the vehicle 10 is approaching a portion of a route that cannot be driven through with the aid of the autopilot function but has to be driven through manually by the driver, the steering wheel 16 is automatically adjusted from the second position 22 into the first position 21. As a result, the driver is intuitively requested to resume the task of driving. The driver can acknowledge taking over the driving task, for example, by simultaneously actuating the two operator control elements 46, 47, whereby the autopilot function is deactivated. Alternatively, the steering wheel 16 may have sensors for sensing when the steering wheel is touched by the driver, and the driver may confirm the takeover of the driving task and deactivate the autopilot function by placing his hands on the steering wheel 16.

Driver assistance systems, which make partially or fully automatic driving of the vehicle possible, are increasingly being used in vehicles, such as, for example, passenger cars or trucks. Modern or future vehicles may therefore be capable under certain conditions of independently taking over both the lateral guidance and the longitudinal guidance. In this case, a driver of the vehicle does not have to monitor this automatic guidance of the vehicle the whole time, which is also referred to as the autopilot function, but can at a suitable point in time transfer the guidance of the vehicle to the autopilot function or retrieve it.

Customary driver assistance systems, such as, for example, automatic speed control systems, in particular adaptive speed control systems, which adapt the speed of the vehicle to vehicles driving in front, have so far been set and configured by using a steering wheel button or steering wheel control lever.

In this connection, DE 10 2007 039 375 B4 discloses a motor vehicle comprising a driver assistance system, which guides it longitudinally and has a Stop&Go function and a sensing device for sensing items of information concerning a vehicle driving in front. Dependent on the information sensed by means of the sensing device, it is possible by means of the driver assistance system to brake the motor vehicle automatically to a standstill and, when it is sensed that the vehicle driving in front is starting to move again, automatically start it moving again based on an actuation signal that can be given by the driver by way of an input device.

DE 19 743 024 A1 relates to a motor vehicle with means for temporary autonomous vehicle guidance and means for the communication of a vehicle user with at least one electronic communication system. For this purpose, an operator control device is provided, by which the communication means can be activated for the purpose of carrying out a communication process and the vehicle guiding means can be activated for the purpose of autonomous vehicle guidance. When it is detected that manual vehicle guidance will be required, the activated vehicle guiding means transmit an item of takeover information to the communication means, which show this takeover information on a display device.

With an activation or deactivation of the autopilot function, much of the responsibility for guiding the vehicle is transferred to the vehicle electronics or to the driver. An activation or deactivation of the autopilot function should therefore not take place inadvertently. On the other hand, a simple and intuitive transfer of responsibility to the vehicle or retrieval of responsibility by the driver is desirable.

LIST OF DESIGNATIONS

10 Vehicle
11 System
12 Driver assistance system
13 Processing device
14 Sensing device
15 Steering column
16 Steering wheel
17 Driver's seat
18 Dashboard
20 Arrow
21 First position
22 Second position
30 Method
31-35 Step
40-43 Spoke
44 Operator control element
45 Operator control element
46 First operator control element
47 Second operator control element
48 First pressure actuating region
49 Second pressure actuating region
50 First pressure actuating region
51 Second pressure actuating region
60 Method
61-63 Step

The invention claimed is:

1. A method for a driver assistance system of a vehicle, wherein the vehicle comprises a steering wheel which is adjustable between a first position and a second position, wherein the steering wheel in the second position further away from a torso of a user sitting in a driver's seat of the vehicle than in the first position, the method comprising:
sensing the position of a steering wheel; and
setting the driver assistance system based on the position of the steering wheel,
wherein the steering wheel is additionally automatically adjustable, and the method further comprises automatically adjusting the steering wheel into the first position in response to the steering wheel being manually adjusted by the user partially from the second position in a direction of the first position.

2. The method of claim 1, wherein the setting of the driver assistance system comprises: activating an autopilot function of the driver assistance system in response to the steering wheel being in the second position, wherein the autopilot function controls the vehicle at least partially automatically, and deactivating the autopilot function of the driver assistance system in response to the steering wheel being in the first position.

3. The method of claim 1, wherein the steering wheel is adjustable between the first position and the second position in a direction of a longitudinal axis of a steering column of the vehicle.

4. A method for a driver assistance system of a vehicle, wherein the vehicle comprises a steering wheel on which a first operator control element and a second operator control element are arranged, the method comprising:
sensing an actuation of the first and second operator control elements; and
setting the driver assistance system based on a simultaneous actuation of the first and second operator control elements,
wherein the vehicle comprises a steering wheel which is automatically adjustable between a first position and a second position, the steering wheel in the second position is further away from a torso of a user sitting in a driver's seat of the vehicle than in the first position, and the method further comprises automatically adjusting the steering wheel from the first position into the second position based on the simultaneous actuation of the first and second operator control elements.

5. The method of claim 4, wherein the setting of the driver assistance system comprises activating an autopilot function of the driver assistance system in response to the first and second operator control elements being actuated simultaneously when the autopilot function is deactivated, wherein the autopilot function controls the vehicle at least partially automatically, and deactivating the autopilot function of the driver assistance system in response to the first and second operator control elements being actuated simultaneously when the autopilot function is activated.

6. The method of claim 4, wherein the first operator control element comprises a first rocker switch and the second operator control element comprises a second rocker switch, the first and second rocker switches respectively having a first pressure actuating region and a second pressure actuating region, wherein the setting of the driver assistance system comprises: activating an autopilot function of the driver assistance system in response to the respective first pressure actuating regions on the first and second rocker switches being actuated simultaneously, the autopilot function controls the vehicle at least partially automatically, and deactivating the autopilot function of the driver assistance system in response to the respective second pressure actuating regions on the first and second rocker switches being actuated.

7. The method of claim 4, wherein the first operator control element is arranged on a first spoke of the steering wheel and the second operator control element is arranged on a second spoke of the steering wheel.

8. The method of claim 4, wherein the driver assistance system has an autopilot function which controls the vehicle at least partially automatically, wherein the method further comprises: determining an end of an autopilot portion of a route, the autopilot function controlling the vehicle automatically along the autopilot portion of a route, and automatically adjusting the steering wheel from the second position into the first position based on the vehicle approaching the end of the autopilot portion of a route.

9. The method of claim 4, the method wherein the setting of the driver assistance system comprises activating an autopilot function of the driver assistance system in response to the steering wheel being in the second position, wherein the autopilot function controls the vehicle at least partially automatically, and deactivating the autopilot function of the driver assistance system in response to the steering wheel being in the first position.

10. A system for activating a driver assistance system in a vehicle, the system comprising:
a steering wheel which is adjustable between a first position and a second position, wherein the steering wheel in the second position is further away from a torso of a user sitting in a driver's seat of the vehicle than in the first position;
a sensing device for sensing the position of the steering wheel; and
a processing device which sets the driver assistance system based on the position of the steering wheel,
wherein the steering wheel is additionally automatically adjustable, into the first position in response to the steering wheel being manually adjusted by the user partially from the second position in a direction of the first position.

11. The system of claim 10, wherein the system the setting of the driver assistance system comprises: activating an autopilot function of the driver assistance system in response to the steering wheel is being the second position, wherein the autopilot function controls the vehicle at least partially automatically, and deactivating the autopilot function of the driver assistance system in response to the steering wheel being in the first position.

12. The system of claim 11, wherein the steering wheel is adjustable between the first position and the second position in a direction of a longitudinal axis of a steering column of the vehicle.

13. A system for activating a driver assistance system in a vehicle, the system comprising:
a steering wheel on which a first operator control element and a second operator control element are arranged; and
a processing device which sets the driver assistance system based on the simultaneous actuation of the first and second operator control elements,
wherein the steering wheel is automatically adjustable between a first position and a second position, wherein the steering wheel in the second position is further away from a torso of a user sitting in a driver's seat of the vehicle than in the first position, and
wherein the steering wheel position is automatically adjusted from the first position into the second position based on the simultaneous actuation of the first and second operator control elements.

14. The system of claim 13, wherein the system the setting of the driver assistance system comprises activating an autopilot function of the driver assistance system in response to the steering wheel being in the second position, wherein the autopilot function controls the vehicle at least partially automatically, and deactivating the autopilot function of the driver assistance system in response to the steering wheel being in the first position.

15. The system of claim 14, wherein the steering wheel is additionally automatically adjustable, into the first position in response to the steering wheel being manually adjusted by the user partially from the second position in the direction of the first position.

16. The system of claim 14, wherein the steering wheel is adjustable between the first position and the second position in the direction of a longitudinal axis of a steering column of the vehicle.

\* \* \* \* \*